United States Patent Office 3,386,917
Patented June 4, 1968

3,386,917
FLUOROALKYLPOLYSILOXANE LUBRICANTS CONTAINING ORGANOPHOSPHORUS ADDITIVES
Harry M. Schiefer, Midland, Mich., assignor to Dow Corning Corporation, Midland, Mich., a corporation of Michigan
No Drawing. Filed July 13, 1966, Ser. No. 564,756
9 Claims. (Cl. 252—49.9)

ABSTRACT OF THE DISCLOSURE

Small amounts of organophosphorus lubricant additives mixed with fluoroalkylmethylpolysiloxane exhibit marked enhancement of anti-wear characteristics of metal-on-metal.

---

This application relates to improved fluoroalkylpolysiloxane lubricants which contain organophosphorus additives. The lubricants of this invention inhibit the wear of rubbing metal surfaces to a highly superior degree, particularly at high loads.

Organophosphorus compounds are known lubricant additives for organopolysiloxanes. U.S. Patent No. 2,684,336, for example, teaches the use of a mixture of dimethylpolysiloxane and a trialkyl phosphate as a lubricant. However, more than 10 weight percent of the phosphate is generally used, resulting in a product which has impaired thermal stability and other properties when compared with the stability of a pure organopolysiloxane. At lower concentrations of organophosphorus compound, little, if any, improvement is noted in the lubricity of such organopolysiloxanes as dimethylpolysiloxane or dimethyl-dichlorophenylmethylpolysiloxane, as shown by the resulting wear.

It has been unexpectedly found that the fluoroalkylmethylpolysiloxanes, alone among the silicones, exhibit significantly improved wear characteristics when small amounts of organophosphorus compounds are mixed with them.

This application relates to a composition consisting essentially of a mixture of (1) 100 parts by weight of an organopolysiloxane fluid containing at least 70 mol percent of

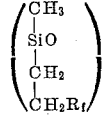

units, any other units present being of the formula $(RSiO_{3/2})$, $R_2SiO$, or $(R_3SiO_{1/2})$, where $R_f$ is a perfluoroalkyl radical of no more than 12 carbon atoms and R is a monovalent hydrocarbon or halohydrocarbon radical; and (2) from 0.5 to 8 parts by weight of a compound selected from the group consisting of $R_nH_{3-n}PO_4$, $R_nH_{(3-n)}PO_3$

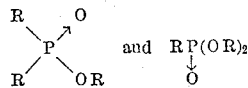

and $RP(OR)_2$ where R is defined above, and $n$ has a value of 2 to 3.
$R_f$ can be any perfluoralkyl radical of no more than 12 carbon atoms, e.g., heptafluoropropyl, perfluorobutyl, perfluoroisohexyl, perfluorooctyl, perfluorododecyl, or, preferably, trifluoromethyl.

R can be any monovalent hydrocarbon radical, e.g., alkyl radicals such as methyl, ethyl, isopropyl, 2-ethylhexyl, or octadecyl; aliphatically unsaturated radicals such as vinyl, allyl, ethynyl, butadienyl, or 4-hexenyl; or aryl-containing radicals such as phenyl, tolyl, xenyl, naphthyl, benzyl, or 2-phenylpropyl.

R can also be any monovalent halohydrocarbon radical, e.g., 3,3,3-trifluoropropyl, chloropropyl, bromohexyl, chloroallyl, dibromophenyl, chlorophenyl, $\alpha,\alpha,\alpha$-trifluorotolyl, and chloroxenyl.

The organophosphorus additives used herein are esters of phosphates, phosphites, primary phosphonates, or secondary phosphonates. The esters of phosphates and phosphites are preferred, and can be classified as those organophosphorus compounds which are free of carbon-phosphorus bonds.

If desired, a solubilizing agent for the organo-phosphorus compound such as glycerol trioctoate can be added to the composition of this invention. It appears that those organophosphorus compounds which are soluble or are rendered soluble are more effective at lower concentrations than are the less soluble materials. Tris (3,3,3-trifluoropropyl) phosphate, for example, promotes the lubricity of the organosilicon fluids used herein at concentrations as low as 0.25 to 0.5 weight percent.

The following examples are illustrative only and should not be construed as limiting the invention, which is properly delineated in the appended claims.

Example 1

Organophosphorus lubricant additives were added to a trimethylsiloxane - endblocked 3,3,3 - trifluoropropyl-methylpolysiloxane which had a viscosity at 25° C. of 232 cs., and these mixtures were tested in a shell four-ball tester at 400° F. for two hours at 1200 r.p.m.

The nature of the additive, the weight percent added based on the weight of the silicone fluid, the load applied to the four balls in the tester, and the resulting scar diameter on the balls were measured:

| Additive | Percent Added | Load (kg.) | Scar Diameter (mm.) |
|---|---|---|---|
| None | | 4 | 0.58 |
| Do | | 10 | 0.65 |
| Do | | 40 | 1.68 |
| Dioctyl hydrogen phosphite | 5 | 4 | 0.54 |
| Do | 5 | 10 | 0.61 |
| Do | 5 | 40 | 0.79 |
| Diisopropyl hydrogen phosphite | 5 | 4 | 0.35 |
| Do | 5 | 10 | 0.48 |
| Do | 5 | 40 | 0.78 |
| Tri-n-butyl phosphate | 5 | 4 | 0.52 |
| Do | 5 | 10 | 0.58 |
| Do | 5 | 40 | 0.62 |
| Tris-2-ethylhexyl phosphate | 3 | 4 | 0.47 |
| Do | 3 | 10 | 0.52 |
| Do | 3 | 40 | 0.65 |
| Tricresyl phosphate | 1.5 | 4 | 0.51 |
| Do | 1.5 | 10 | 0.64 |
| Do | 1.5 | 40 | 0.94 |
| Triethyl phosphate | 3 | 40 | 0.87 |
| Trioctyl phosphate | 3 | 40 | 0.65 |
| Do | 10 | 40 | 0.94 |
| Tris($\beta$-chloroethyl)phosphate | 1 | 40 | 1.19 |

The following experiments were performed for comparison:

The compositions named below were tested as lubricants in a Shell four-ball tester at 400° F. for two hours at 1200 r.p.m. The load applied to the four balls in the tester and the resulting scar diameter on the balls were measured:

| Composition | Scar Diameter (mm.) at— | |
|---|---|---|
| | 10 kg. load | 40 kg. load |
| (a) Dimethylpolysiloxane having a viscosity at 25° C. of 100 cs. | 0.63 | >2.0 |
| (b) 95.8 weight percent of (a) above plus 4.2 percent of trioctyl phosphate | 0.85 | |
| (c) 90 weight percent of (a) above plus 10 percent of trioctyl phosphate | 1.39 | >2.0 |
| (d) A neutralized fluid hydrolyzate of 84.5 parts by weight of dimethyldichlorosilane, 8.5 parts of tetrachlorophenyltrichlorosilane, and 7.0 parts of trimethylchlorosilane | 2.07 | |
| (e) 95 weight percent of (d) above plus 5 percent of tricresyl phosphate | 2.26 | |
| (f) 95 weight percent of (d) above plus 5 percent of trioctyl phosphate | 1.90 | |

Example 2

The following lubricant additives were added to a trimethylsiloxane-endblocked 3,3,3-trifluoropropylmethylpolysiloxane having a viscosity at 25° C. of 100 cs., and tested in a Shell four-ball tester at 400° F. for one-half hour with a load of 20 kg. and a rate of 1200 r.p.m.

The results in each case were as follows:

| Additive | Weight Percent Added | Scar Diameter (mm.) |
|---|---|---|
| None | | 0.90 |
| Tris(3,3,3-trifluoropropyl)phosphate | 1 | 0.46 |
| Do | 2 | 0.50 |
| One percent of tricresyl phosphate plus 2 percent of a fatty acid triester of trimethyloIpropane as a solubilizing agent | 1 | 0.66 |

Example 3

When the following amounts of any of the following organophosphorus compounds are added to 100 g. of a fluid organopolysiloxane of the formula $$(C_6H_3Cl_2SiO_{3/2}) \begin{bmatrix} CH_3 \\ | \\ SiO \\ | \\ CH_2 \\ | \\ CH_2C_4F_9 \end{bmatrix}_{10} \begin{bmatrix} CH_3 \\ | \\ SiO \\ | \\ CH_2 \\ | \\ CH_2CF_3 \end{bmatrix}_{20} \begin{bmatrix} CH_3 \\ | \\ SiO \\ | \\ C_3H_7 \end{bmatrix}_2 \begin{bmatrix} CH=CH_2 \\ | \\ O_{1/2}SiC_6H_5 \\ | \\ CH_2 \\ | \\ CH_2 \\ | \\ C_7F_{15} \end{bmatrix}_3$$

improved lubricity on the part of the fluid mixture is obtained:

Organophosphorus Compound:     Amount, g.
- Dibromophenylhydrogen phosphate _____ 4
- Tris(2-phenylpropyl)phosphite _____ 6
- See footnote * _____ 2
- See footnote ** _____ 1.5
- Bis-(2-ethylhexyl)-2-ethylhexylphosphonate ___ 3
- See footnote † _____ 5
- Cyclohexylbenzylhydrogen phosphate _____ 6
- Triphenyl phosphate _____ 5
- Biphenyldibutyl phosphate _____ 5
- See footnote ‡ _____ 5
- Tri(p-t-butylphenyl)phosphate _____ 5

$*CF_3CH_2CH_2P(OCH_3)_2$
$\qquad \downarrow$
$\qquad O$ $**(CF_3\text{-}\langle\text{phenyl}\rangle\text{-}CH_2\text{-})_2POC_8H_{17}$
$\qquad \downarrow$
$\qquad O$ $† CH_2=CHCH_2P(OC_{12}H_{25})_2$
$\qquad \downarrow$
$\qquad O$ $‡ \langle\text{phenyl}\rangle P(OC_8H_{17})_2$
$\qquad \downarrow$
$\qquad O$ That which is claimed is:

1. A composition consisting essentially of a mixture of (1) 100 parts by weight of an organopolysiloxane fluid containing at least 70 mol percent of $$\begin{bmatrix} CH_3 \\ | \\ SiO \\ | \\ CH_2 \\ | \\ CH_2R_f \end{bmatrix}$$

units, any other units present being of the formula $(RSiO_{3/2})$, $(R_2SiO)$, or $(R_3SiO_{1/2})$, where $R_f$ is a perfluoroalkyl radical of no more than 12 carbon atoms and R is a monovalent hydrocarbon or halohydrocarbon radical; and (2) from 0.5 to 8 parts by weight of a compound selected from the group consisting of $R_nH_{3-n}PO_4$, $R_nH_{(3-n)}PO_3$, $$\begin{array}{c} R \\ \diagdown \\ P \\ \diagup \\ R \end{array} \begin{array}{c} O \\ \diagup \\ \\ \diagdown \\ OR \end{array} , \text{ and } RP(OR)_2 \atop \downarrow \atop O$$

where R is defined above, and n has a value of 2 to 3.

2. The composition of claim 1 where at least 0.9 part by weight of ingredient (2) is dissolved in ingredient (1).

3. The composition of claim 1 where ingredient (1) is a polymer of 3,3,3-trifluoropropylmethylsiloxane which has endblocks of the formula $(R_3SiO_{1/2})$.

4. The composition of claim 3 where R is methyl.

5. The composition of claim 1 where ingredient (2) is tris(2-ethylhexyl)phosphate.

6. The composition of claim 1 where ingredient (2) is tributylphosphate.

7. The composition of claim 1 where ingredient (2) is tricresyl phosphate.

8. The composition of claim 1 where ingredient (2) is diisopropylhydrogen phosphite.

9. The composition of claim 1 where ingredient (2) is free of carbon-phosphorus bonds.

References Cited

UNITED STATES PATENTS

| | | | |
|---|---|---|---|
| 2,684,336 | 7/1954 | Moreton | 252—49.9 |
| 2,832,740 | 4/1958 | Garden et al. | 252—49.9 |
| 2,836,611 | 5/1958 | Exner et al. | 252—49.6 XR |
| 3,109,816 | 11/1963 | Feng et al. | 252—49.9 XR |
| 3,127,433 | 3/1964 | Tarrant | 252—49.6 XR |
| 3,192,157 | 6/1965 | Gowdy | 252—49.6 XR |
| 3,321,401 | 5/1967 | Ford et al. | 252—49.9 XR |

DANIEL E. WYMAN, *Primary Examiner.*

WARREN H. CANNON, *Assistant Examiner.*